United States Patent
Heyrman et al.

(10) Patent No.: US 9,569,364 B1
(45) Date of Patent: Feb. 14, 2017

(54) MULTIPLE HISTORY BASED MICRO PARTITION PREFETCH OPTIMIZATION

(71) Applicant: International Business Machines Corporation, Armonk, NY (US)

(72) Inventors: Peter J. Heyrman, Rochester, MN (US); Bret R. Olszewski, Austin, TX (US); Ram Raghavan, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/018,199

(22) Filed: Feb. 8, 2016

(51) Int. Cl.
*G06F 12/00* (2006.01)
*G06F 12/08* (2016.01)

(52) U.S. Cl.
CPC ....... *G06F 12/0862* (2013.01); *G06F 12/0804* (2013.01); *G06F 2212/1021* (2013.01); *G06F 2212/1024* (2013.01); *G06F 2212/152* (2013.01); *G06F 2212/507* (2013.01); *G06F 2212/602* (2013.01); *G06F 2212/6024* (2013.01)

(58) Field of Classification Search
CPC .............. G06F 12/0862; G06F 12/0804; G06F 2212/1021; G06F 2212/1024; G06F 2212/152; G06F 2212/507; G06F 2212/602; G06F 2212/6024
See application file for complete search history.

(56) References Cited

U.S. PATENT DOCUMENTS

| 5,293,609 | A | 3/1994 | Shih et al. |
| 5,694,568 | A | 12/1997 | Harrison, III et al. |
| 7,904,660 | B2 | 3/2011 | Franaszek |
| 2008/0005208 | A1* | 1/2008 | Vaswani ............ G06F 11/3466 |
| 2012/0072911 | A1* | 3/2012 | Whaley .................. G06F 21/64 |
| | | | 718/1 |

FOREIGN PATENT DOCUMENTS

EP 0173893 A2 3/1986

OTHER PUBLICATIONS

Raman, "A Study of Cluster Paging Methods to Boost Virtual Memory Performance," Diss., University of Cincinnati, 2002, 78 pages.
Ding et al., "DiskSeen: Exploiting Disk Layout and Access History to Enhance I/O Prefetch," USENIX Annual Technical Conference. vol. 7, 2007, 21 pages.

(Continued)

*Primary Examiner* — Kalpit Parikh
(74) *Attorney, Agent, or Firm* — Patterson + Sheridan, LLP (57) ABSTRACT

Techniques are disclosed for prefetching cache lines. One technique includes dispatching a virtual processor and recording a first set of addresses associated with one or more cache lines used by the virtual processor. The technique also includes redispatching the virtual processor and recording a second set of addresses associated with one or more cache lines used by the virtual processor. The technique further includes comparing the first set of addresses with the second set of addresses to determine one or more common addresses between the first set and the second set. The technique includes placing the one or more common addresses into a memory. Finally, the technique includes redispatching the virtual processor.

17 Claims, 4 Drawing Sheets

(56) References Cited

OTHER PUBLICATIONS

Nesbit et al., "Data Cache Prefetching Uusing a Global History Buffer," Software, IEE Proceedings—IEEE, 2004, 10 pages.
Johnson, "Working Set Prefetching for Cache Memories," ACM SIGARCH Computer Architecture News 17.6, 1989, pp. 137-141.
Chen et al., "Data Access History Cache and Associated Data Prefetching Mechanisms," Supercomputing, 2007, SC'07, Proceedings of the 2007 ACM/IEEE Conference on IEEE, 2007, 12 pages.

* cited by examiner

MULTIPLE HISTORY BASED MICRO PARTITION PREFETCH OPTIMIZATION

BACKGROUND

The present disclosure generally relates to computer systems, and more specifically, to cache prefetching.

A microprocessor in a computer system may employ a concept known as micro partition prefetch (MPP). Micro partition prefetch provides a mechanism for hardware to write L2 or L3 cache address tags to a memory buffer. In particular, the addresses of recently used cache lines by a virtual processor are saved to the memory buffer. The addresses are recorded while the virtual processor is dispatched. The virtual processor is then undispatched, and the addresses have been stored in the memory buffer. Then, when the virtual processor is redispatched at a later point in time, the cache lines associated with the addresses saved in the memory buffer are prefetched and stored in the cache. It is assumed that some percentage of the recently used addresses will be used again by the virtual processor, so fetching these addresses into cache should improve overall performance.

However, micro partition prefetch may hinder system performance in some implementations. First, the previously saved cache state may include items that will not be used when the virtual processor is redispatched. Prefetching these items eliminates potential cache hits that might occur for this or another virtual processor. Second, micro partition prefetch increases memory subsystem traffic, which could result in delays for accesses that occur on other processors on the same chip.

SUMMARY

One embodiment presented herein discloses a method for prefetching cache lines. The method generally includes dispatching a virtual processor and then undispatching the virtual processor and recording a first set of addresses associated with one or more cache lines used by the virtual processor. The method also includes redispatching the virtual processor, undispatching the virtual processor, and recording a second set of addresses associated with one or more cache lines used by the virtual processor. The method further includes comparing the first set of addresses with the second set of addresses to determine one or more common addresses between the first set and the second set. The method includes placing the one or more common addresses into a memory. Finally, the method includes redispatching the virtual processor.

Other embodiments include, without limitation, a computer program product that includes a non-transitory storage medium having computer-readable program code that enables a processing unit to implement one or more aspects of the disclosed methods. The computer-readable program code is executable by a processor to cause the processor to dispatch a virtual processor, undispatch the virtual processor, and record a first set of addresses associated with one or more cache lines used by the virtual processor. The code is executable to redispatch the virtual processor, undispatch the virtual processor, and record a second set of addresses associated with one or more cache lines used by the virtual processor. The code is further executable to compare the first set of addresses with the second set of addresses to determine one or more common addresses between the first set and the second set. The code is also executable to place the one or more common addresses into a memory and redispatch the virtual processor.

Other embodiments include, without limitation, a system having a processor, memory, and application programs configured to implement one or more aspects of the disclosed methods. A memory stores a program, which, when executed on the processor, performs an operation for prefetching cache lines. The operation includes dispatching a virtual processor, undispatching the virtual processor, and recording a first set of addresses associated with one or more cache lines used by the virtual processor. The operations include redispatching the virtual processor, undispatching the virtual processor, and recording a second set of addresses associated with one or more cache lines used by the virtual processor. The operations further include comparing the first set of addresses with the second set of addresses to determine one or more common addresses between the first set and the second set. The operations also include placing the one or more common addresses into a memory and redispatching the virtual processor.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Embodiments presented herein disclose hardware and software means to optimize micro partition prefetch. In particular, a history of the addresses of cache lines is collected during the dispatch of a virtual processor for at least two dispatches of the virtual processor. The multiple histories can then be compared for commonality; i.e., addresses that appear in each of the histories or in more than one history. The common addresses are used to drive the micro partition prefetch activity for the next dispatch of the virtual processor. In some embodiments, a subset of addresses that are not in common with previous addresses may also be used to drive the micro partition prefetch activity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 1:
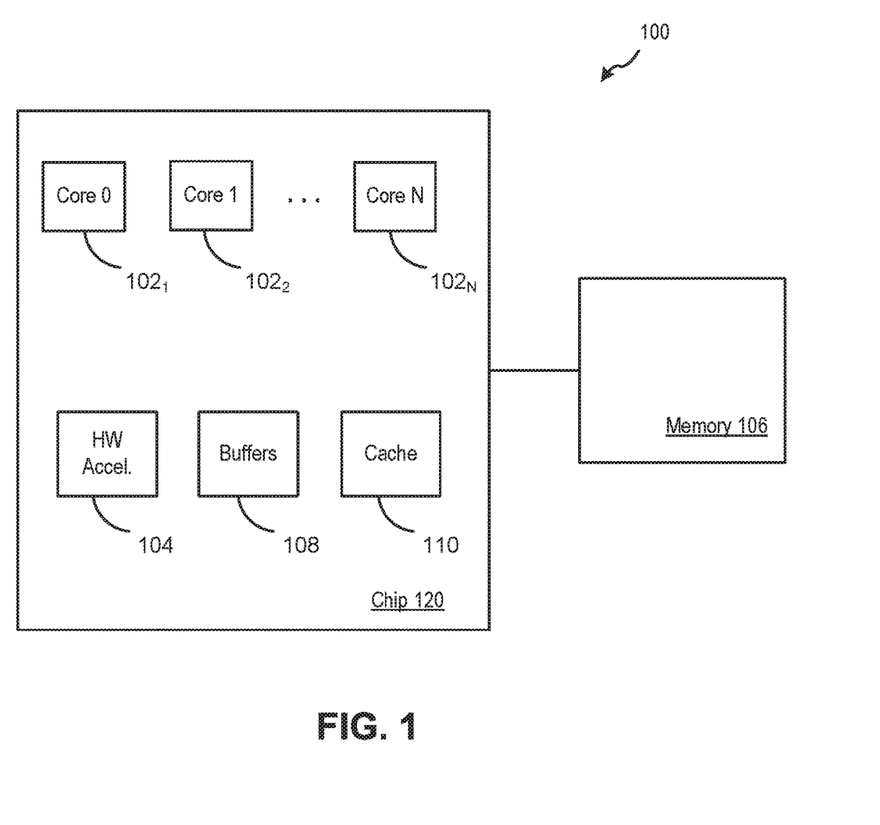
FIG. 1 illustrates an example multi-core processor, according to one embodiment.

FIG. 1 illustrates a computer system 100 according to one embodiment for prefetching cache lines. The computer system 100 includes a chip 120 that includes one or more processor cores 102, shown as Core 1, Core 2, . . . , Core N. Embodiments described herein may utilize any number N of processor cores 102. Each core may run multiple threads. In some embodiments, cores can be separated into subcores (known as "micro threading mode). One or more threads can run on each subcore. In some embodiments, components of system 100 shown as on chip 120 may be located off the chip, and components of system 100 shown as off chip 120 may be located on the chip.

Virtual processors may run on processor cores 102. A virtual processor (or virtual central processing unit (CPU)) is a physical CPU that is assigned to a virtual machine. Virtual machines are generally allocated one virtual CPU each. If a physical host has multiple CPU cores at its disposal (as seen with chip 120), then a CPU scheduler assigns execution contexts and the virtual CPU becomes a series of time slots on logical processors. A hypervisor can schedule requests from the virtual machines across the CPU cores.

Computer system 100 also comprises memory 106. Memory 106 may comprise a random access memory (RAM), a read-only memory (ROM), an erasable programmable read-only memory (EPROM or Flash memory), an optical storage device, a magnetic storage device, or any suitable combination of the foregoing. Memory 106 is operable to store data that may be retrieved for processor operations.

Computer system 100 also comprises a hardware accelerator 104 in some embodiments. Hardware accelerator 104 may be used to implement comparison logic that could be optimized for the comparison functions described herein. A comparison engine could run out of band with the critical processor path, so as to not impact the cost of dispatching new virtual processors.

Computer system 100 further comprises buffers 108. Buffers 108 can be used to store a history or histories of memory accesses of a virtual processor in some embodiments. Any suitable number of buffers may comprise buffers 108. In embodiments described herein, a first buffer 108 can store a history of accesses associated with a virtual processor. When the virtual processor stops, the first buffer 108 stops storing new accesses. When the virtual processor is dispatched again (or "redispatched"), a second buffer 108 stores the history of accesses for the second dispatch. Additional buffers 108 may store access for other dispatches of the virtual processor. Then, as described in further detail below, accesses from the different buffers 108 may be compared and used to prefetch items into cache.

Computer system 100 further comprises a cache 110. Cache 110 may comprise any configuration or type of cache, such as L2, L3, and/or L4 cache. Cache 110 is illustrated as being on chip 120, but in some embodiments part or all of cache 110 may be located off chip. While cache 110 is illustrated as one block in this example, some embodiments may employ multiple caches.

Figure 2:
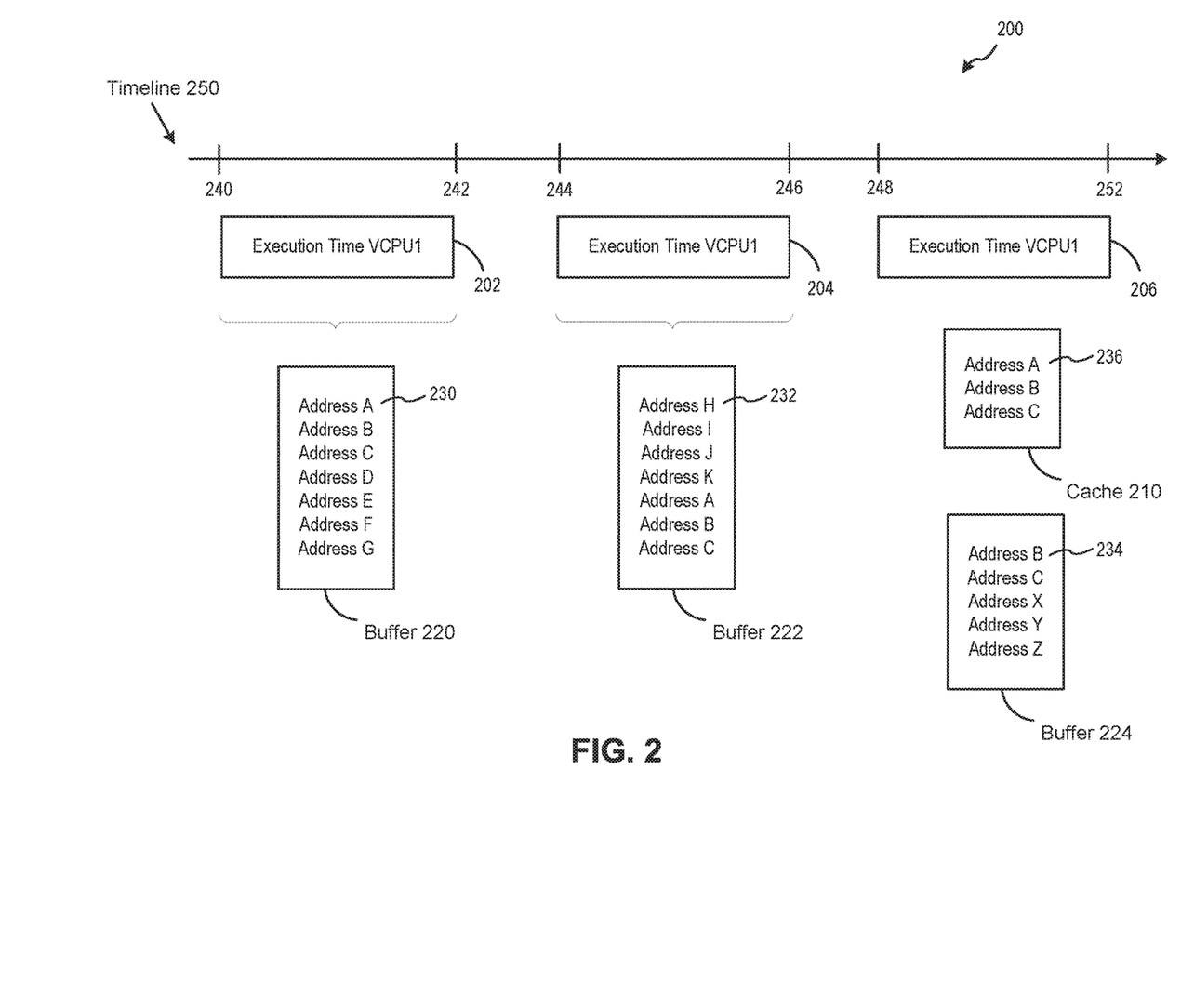
FIG. 2 illustrates a system for prefetching cache lines according to an embodiment.

FIG. 2 illustrates a system 200 for prefetching cache lines according to an embodiment. At the top of FIG. 2 is illustrated a timeline 250, with various points of time marked along the timeline. Underneath timeline 250 are various blocks (202, 204, and 206) that represent execution time for a virtual processor (VCPU1). During the various blocks of execution time (i.e., when VCPU1 is dispatched), addresses used by instructions, translations, and/or data references are recorded and stored in a buffer, such as buffer 220 or buffer 222. After at least two dispatches of the VCPU, the addresses stored in the buffers can be compared and a common set of addresses can be fetched from memory and stored in cache for the third or subsequent dispatch of the VCPU. Ideally, prefetching the common addresses instead of all previous addresses from the history buffers improves the accuracy of the cache state that is prefetched.

An example process begins at time 240 along timeline 250. At time 240, a virtual processor (VCPU1) is dispatched by a hypervisor. That is, the virtual processor begins executing instructions on a processor core. The execution time of VCPU1 for this particular dispatch is indicated as block 202. As instructions are executed, data needed to execute the instructions is retrieved from memory and stored in a cache. The addresses 230 of these recently used cache lines are stored in buffer 220. A hypervisor or hardware directs the addresses to be saved in the buffer 220. Addresses 230 are continually saved in buffer 220 as long as VCPU1 is dispatched. In this example, VCPU1 is dispatched from time 240 until time 242. As history buffer 220 fills up, the least recently used addresses may be removed from the buffer 220 and replaced with the most recently used accesses (i.e., a rotating history buffer).

When VCPU1 stops executing at time 242 (i.e., VCPU1 is undispatched), addresses 230 are no longer recorded in history buffer 220. In this example, addresses A, B, C, D, E, F, and G are stored in history buffer 220. These addresses are saved in history buffer 220 for use later in the process. While VCPU1 is undispatched, no additional addresses are being recorded in buffer 220.

From time 242 to time 244 on timeline 250, VCPU1 is undispatched. At time 244, VCPU1 is dispatched again (i.e., VCPU1 is redispatched). The execution time for this second dispatch of VCPU1 stretches from time 244 to time 246, and is indicated as block 204. VCPU1 again begins executing instructions on a processor core. As instructions are executed, data needed to execute the instructions is retrieved from memory and stored in the cache. The addresses 232 of these recently used cache lines are stored in another history buffer 222. A hypervisor or hardware directs the addresses to be saved in the buffer 222. Addresses 232 are continually saved as long as VCPU1 is dispatched. As the history buffer 222 fills up, the least recently used addresses may be removed from the buffer and replaced with the most recently used accesses.

When VCPU1 stops executing at time 246 (i.e., VCPU1 is undispatched again), the hypervisor or hardware stops recording addresses 232 in history buffer 222. In this example, addresses H, I, J, K, A, B, and C are stored in history buffer 222. These addresses are saved in history buffer 222 for use later in the process. While VCPU1 is undispatched, no additional addresses are being recorded in buffer 222.

VCPU1 can continually be undispatched and redispatched as many times as needed to perform processor operations. Each time VCPU1 is dispatched, addresses of cache lines are stored in buffers. After two or more dispatches, prefetching of cache lines may be performed to improve the operation of the cache. As an example, VCPU1 is redispatched at time 248. Two or more of the previous histories of the cache state for dispatches of VCPU1 can be compared for commonality, and the common addresses between the two or more previous histories can be prefetched for this next virtual processor dispatch. In this example, buffers 220 and 222 have stored the addresses of previous dispatches of VCPU1. These two sets of addresses can be compared for commonality. The comparison is performed by an on-chip hardware accelerator in some embodiments. As shown in FIG. 2, addresses A, B, and C are the common addresses stored in buffers 220 and 222 (denoted as addresses 236). Therefore addresses A, B, and C are prefetched and stored in cache 210 when VCPU1 is dispatched at time 248. These addresses are stored in the cache and the data is ready to be used, if needed, by the third dispatch of VCPU1 beginning at time 248. Prefetching this data into the cache can save time during operations of VCPU1.

Prefetching only the common addresses from the history buffers provides advantages over previous solutions that prefetched all addresses from one or more history buffers. First, addresses that have been used in more than one previous dispatch of the virtual CPU should have a higher probability of being used in a current dispatch of the virtual CPU than addresses that have only been used in one previous dispatch. Second, prefetching all previous addresses can lead to prefetching addresses that have a low likelihood of being used in future dispatches. Prefetching too many addresses therefore uses memory subsystem bandwidth without the benefit of increasing the number of cache hits. A large amount of unnecessary prefetching can then cause memory subsystem delays for accesses on other processors on the same chip in memory bandwidth constrained systems.

As shown in FIG. 2, addresses can be stored in a third buffer 224 during the third dispatch of VCPU1 beginning at time 248. Then, for a fourth or subsequent dispatch of VCPU1, the addresses stored in buffers 220, 222, and 224 can all be compared for commonality. Or, in some embodiments, a subset of the buffers may be compared for commonality. For example, only the most recent X number of buffers could be compared for common addresses, with older buffers being ignored or cleared for reuse.

Figure 3:
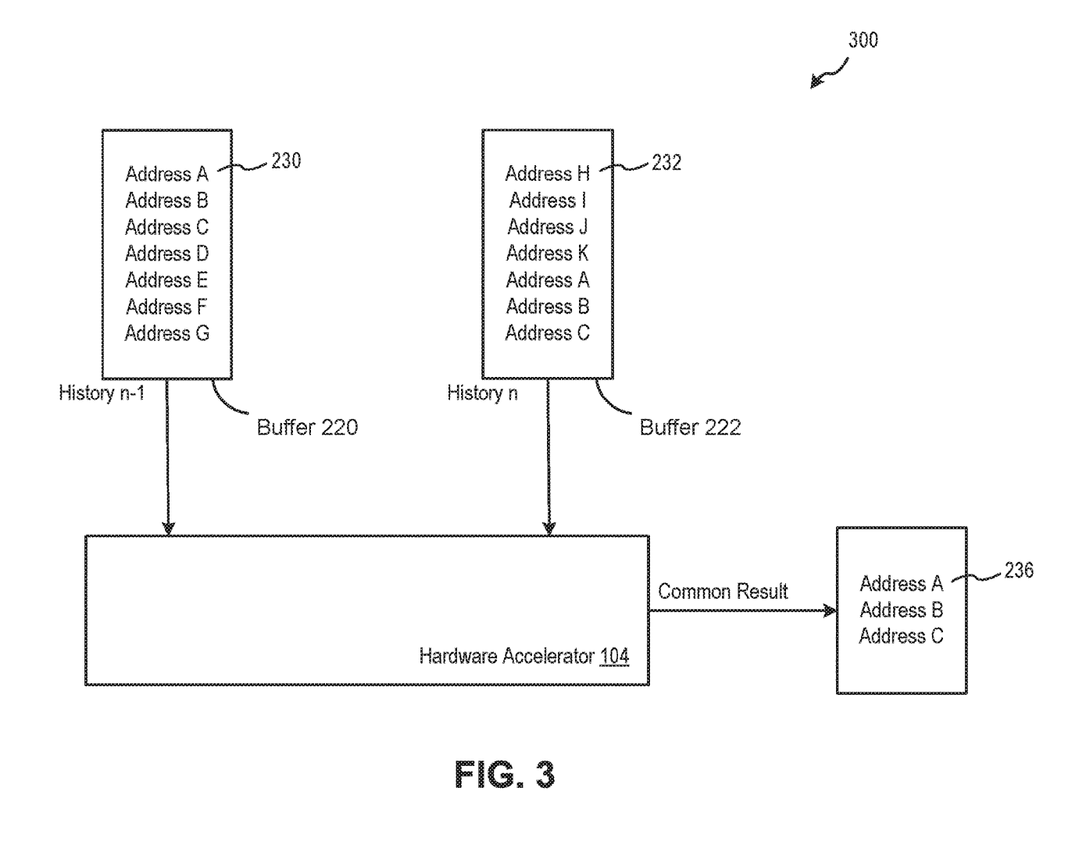
FIG. 3 illustrates a system for prefetching cache lines according to an embodiment.

FIG. 3 illustrates a system 300 for prefetching cache lines according to an embodiment. FIG. 3 illustrates a depiction of hardware that may be used to implement one or more embodiments described herein. System 300 comprises at least two history buffers. Buffers 220 and 222 are illustrated here. Buffers 220 and 222 store addresses of recently used cache lines from separate dispatches of a virtual CPU. Buffer 220 stores addresses 230 from a first dispatch of a virtual CPU (History n−1), and buffer 222 stores addresses 232 from a subsequent dispatch of a virtual CPU (History n). As shown, buffer 220 stores addresses A, B, C, D, E, F, and G. Buffer 222 stores addresses H, I, J, K, A, B, and C.

A comparison of the addresses in buffers 220 and 222 can be performed by a hardware accelerator 104 in some embodiments. Other embodiments may implement the comparison logic using different hardware and/or software. Hardware accelerator can be implemented on chip 120 as illustrated in FIG. 1 above. A hardware accelerator 104 can be optimized for the comparison function. The hardware accelerator 104 compares the addresses stored in two or more buffers to determine one or more common addresses. These common addresses can then be used to prefetch cache lines for the next dispatch of the virtual CPU. In this example, addresses 236 (A, B, and C), are the common addresses amongst the two buffers 220 and 222. Those addresses can be prefetched and stored in cache when the virtual CPU is redispatched.

A default rule could be created if there are no addresses in common among the two or more history buffers compared by hardware accelerator 104. As one example, if there are no common addresses then no prefetching would be performed. As another example, if there are no common addresses then one or more of the addresses from the most recent history buffer may be prefetched. Other combinations of addresses could be prefetched in other embodiments. Another default rule could be created for the situation where there are a very large number of addresses in common. Prefetching every address in common may consume too much memory bandwidth or take too much time, so hardware accelerator 104 may only prefetch a predetermined number of addresses in some embodiments. That number could be, for example, the most recent N number of common addresses.

The hardware accelerator 104 could also implement different rules depending on how many history buffers are being compared. For example, with 2 or 3 history buffers, the hardware accelerator 104 may output only those addresses that are common amongst all of the buffers. However, if there are 4 or more buffers, the hardware accelerator 104 may output addresses that are found each buffer plus a subset of addresses that are found in 3 buffers, for example. Or the hardware accelerator may output any address that is found in 2 or more buffers. In other embodiments, the hardware accelerator may only compare addresses found in the last N number of history buffers, and ignore addresses found in history buffers older than that, under the theory that older addresses are less likely to be reused than newer addresses. Those skilled in the art will recognize that there are a wide variety of rules that can be implemented by the hardware accelerator 104 to output addresses when there are more than two history buffers.

In some embodiments, the hardware accelerator 104 could be biased to include some small subset of current addresses that are not in common with any previous addresses. For example, the most recently used current history could theoretically have a higher probability of reuse on the next dispatch of the virtual processor, so the hardware accelerator 104 could prefetch the common addresses and a specific number of the most recently used non-common addresses.

Figure 4:
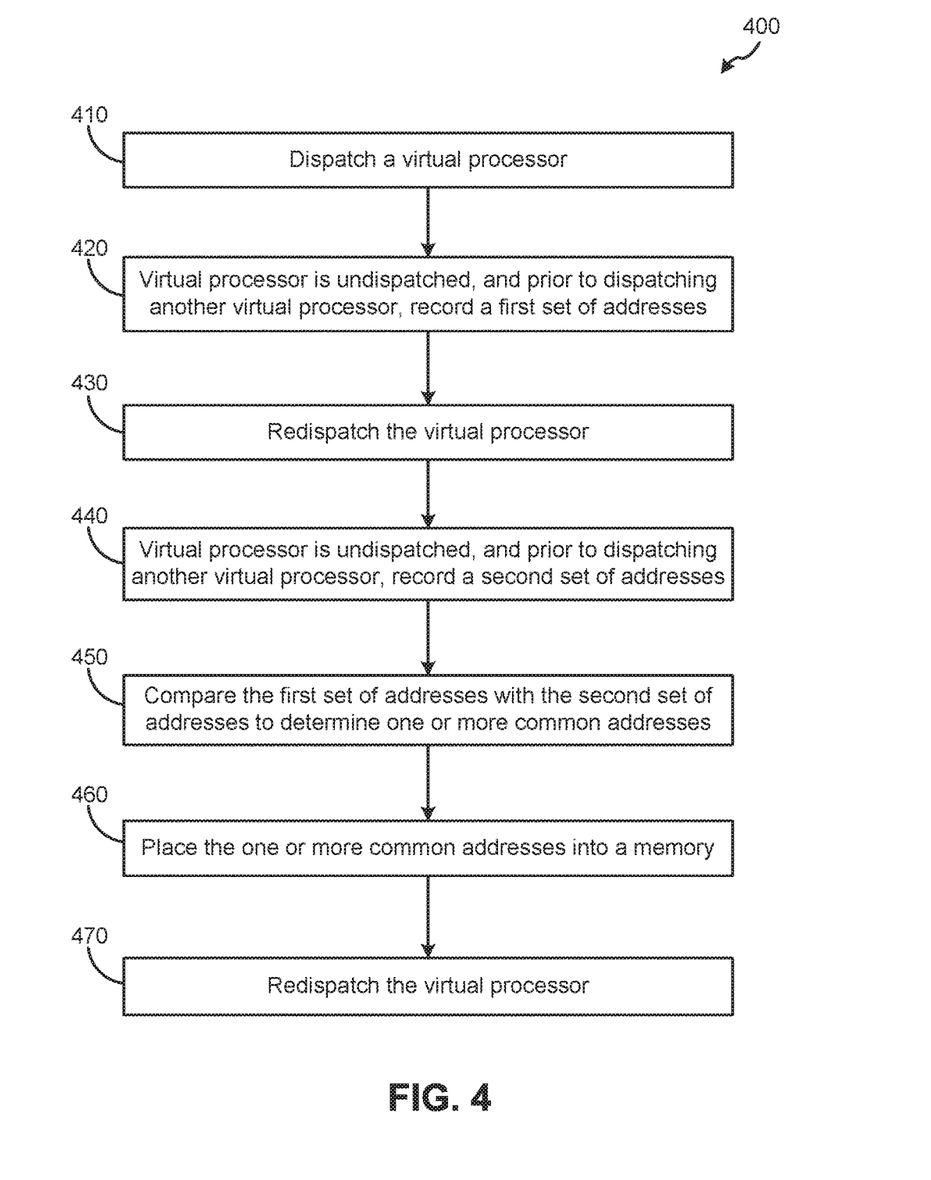
FIG. 4 is a flowchart illustrating an example method for prefetching cache lines.

FIG. 4 is a flowchart illustrating an example method 400 for prefetching cache lines, according to one embodiment. Although the method steps are described in conjunction with the systems of FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 4. As an example, processor chip 120 can perform the steps of FIG. 4.

Method 400 begins with step 410, where a hypervisor dispatches a virtual processor. The virtual processor can run on a core 102 of chip 120 as illustrated in FIG. 1. At step 420, the virtual processor is undispatched, and the hypervisor or hardware records a first set of addresses associated with one or more cache lines used by the virtual processor. This first set of addresses can be stored in a first history buffer, as illustrated above. The addresses may be used by instructions, translations, and data references. The first buffer can be a rotating history buffer, where most recently used addresses replace the least recently used addresses. The addresses are stored prior to dispatching another virtual processor.

Other filtering choices could be implemented. The type of memory access or the source of the memory access could be utilized for filtering. For example, if the addresses recorded in the history buffer were accompanied by additional state information that recorded the nature of the access (such as instruction fetch, data load, data store, instruction translation fetch, or data instruction fetch), various filtering could be done to select only one category or multiple categories of matches. Further state information could be collected to record the source of the access, for example on-chip cache, off-chip cache (e.g. another chip's cache), local memory, or remote memory (e.g. another chip's memory). Filtering could also be enabled for the source; for example, remote memory accesses may have longer latencies than on-chip accesses (when the data is more often accessed in the previously recorded behavior). Filtering could be performed before or after the common addresses are determined.

Addresses are recorded in the first buffer until the virtual processor is undispatched, at which point no more addresses are stored in the first buffer and the contents of the first buffer are preserved. At step 430, the virtual processor is redispatched. That is, the virtual processor is dispatched again to continue performing operations. At step 440, virtual processor is undispatched, and the hypervisor or hardware records a second set of addresses associated with one or more cache lines used by the virtual processor. This second set of addresses is stored in a second history buffer, as illustrated above. The addresses may be used by instructions, translations, and data references. The second buffer can also be a rotating history buffer, where most recently used addresses replace the least recently used addresses. The addresses are stored prior to dispatching another virtual processor.

Addresses are recorded in the second buffer until the virtual processor is undispatched, at which point no more addresses are stored in the second buffer and the contents of the second buffer are preserved.

At step 450, the hardware accelerator or other logic compares the first set of addresses with the second step of addresses to determine one or more common addresses among the sets. The one or more common addresses will be used to prefetch cache lines for the redispatch of the virtual processor in step 470. At step 460, the one or more common addresses are stored in a memory by the hardware accelerator or other logic, and the common addresses can then be used to prefetch likely used addresses.

At step 470, the virtual processor is redispatched. Due to the previous steps, the common addresses are stored in a memory. Those addresses can be used to prefetch cache lines for this dispatch of the virtual processor, as described herein.

Note that in the example illustrated in FIG. 4, the virtual processor is dispatched three times, and the common addresses are prefetched for the third dispatch. The virtual processor can be dispatched any number of times, and prefetching using some subset of common addresses can occur for any of the dispatches after the second dispatch.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A method for prefetching cache lines, comprising:
   dispatching a virtual processor;
   undispatching the virtual processor and recording a first set of addresses associated with one or more cache lines used by the virtual processor;
   redispatching the virtual processor;
   undispatching the virtual processor and recording a second set of addresses associated with one or more cache lines used by the virtual processor;
   comparing the first set of addresses with the second set of addresses to determine one or more common addresses between the first set and the second set;
   selecting one or more addresses from the second set of addresses that are not in common with the first set of addresses;
   placing the one or more common addresses and the one or more addresses from the second set of addresses that are not in common with the first set of addresses into a memory; and
   redispatching the virtual processor.

2. The method of claim 1, wherein the first set of addresses and the second set of addresses comprise addresses most recently used by the virtual processor.

3. The method of claim 1, further comprising:
   recording state information for the first set of addresses and the second set of addresses; and
   filtering the one or more common addresses based on the state information.

4. The method of claim 3, wherein the state information further comprises a source of a memory access.

5. The method of claim 1, wherein comparing the first set of addresses with the second set of addresses further comprises:
   comparing the addresses with a hardware accelerator.

6. The method of claim 1, wherein the one or more addresses selected from the second set of addresses are addresses most recently used by the virtual processor.

7. The method of claim 1, further comprising:
   prefetching cache lines associated with the one or more common addresses into a cache memory.

8. A computer program product for prefetching cache lines, the computer program product comprising a non-transitory computer-readable storage medium having computer-readable program code embodied therewith, the computer-readable program code executable by a processor to cause the processor to:
   dispatch a virtual processor;
   undispatch the virtual processor, and record a first set of addresses associated with one or more cache lines used by the virtual processor;
   redispatch the virtual processor;
   undispatch the virtual processor, and record a second set of addresses associated with one or more cache lines used by the virtual processor;
   compare the first set of addresses with the second set of addresses to determine one or more common addresses between the first set and the second set;

select one or more addresses from the second set of addresses that are not in common with the first set of addresses;

place the one or more common addresses and the one or more addresses from the second set of addresses that are not in common with the first set of addresses into a memory; and redispatch the virtual processor.

9. The computer program product of claim 8, wherein the first set of addresses and the second set of addresses comprise addresses most recently used by the virtual processor.

10. The computer program product of claim 8, the computer-readable program code executable by the processor to further cause the processor to:

record state information for the first set of addresses and the second set of addresses; and filter the one or more common addresses based on the state information.

11. The computer program product of claim 10, wherein the state information further comprises a source of a memory access.

12. The computer program product of claim 8, wherein comparing the first set of addresses with the second set of addresses further comprises:

comparing the addresses with a hardware accelerator.

13. The computer program product of claim 8, wherein the one or more addresses selected from the second set of addresses are the most recently used addresses.

14. The computer program product of claim 8, the computer-readable program code executable by the processor to further cause the processor to:

prefetch cache lines associated with the one or more common addresses into a cache memory.

15. A system, comprising:

a processor; and a memory storing a program, which, when executed on the processor, performs an operation for prefetching cache lines, the operation comprising:

dispatching a virtual processor;

undispatching the virtual processor, and recording a first set of addresses associated with one or more cache lines used by the virtual processor;

redispatching the virtual processor;

undispatching the virtual processor, and recording a second set of addresses associated with one or more cache lines used by the virtual processor;

comparing the first set of addresses with the second set of addresses to determine one or more common addresses between the first set and the second set;

selecting one or more addresses from the second set of addresses that are not in common with the first set of addresses;

placing the one or more common addresses and the one or more addresses from the second set of addresses that are not in common with the first set of addresses into a memory; and redispatching the virtual processor.

16. The system of claim 15, wherein the first set of addresses and the second set of addresses comprise addresses most recently used by the virtual processor.

17. The system of claim 15, further comprising:

recording state information for the first set of addresses and the second set of addresses; and filtering the one or more common addresses based on the state information.

\* \* \* \* \*